Nov. 17, 1964     H. SIEGEL     3,157,303
NURSING BOTTLE HOLDER
Filed April 15, 1963     3 Sheets-Sheet 1
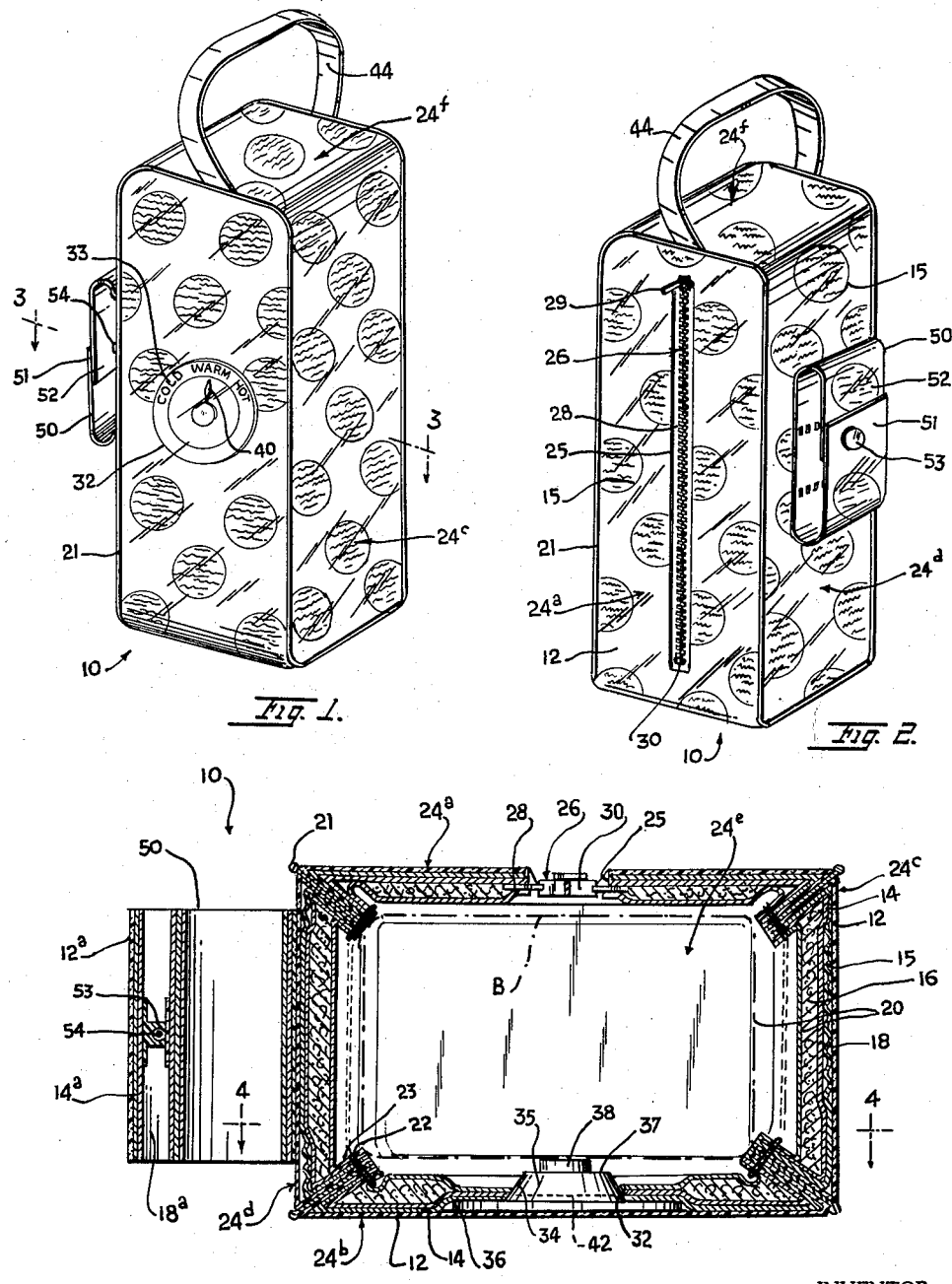
INVENTOR.
HARRY SIEGEL
BY
ATTORNEY

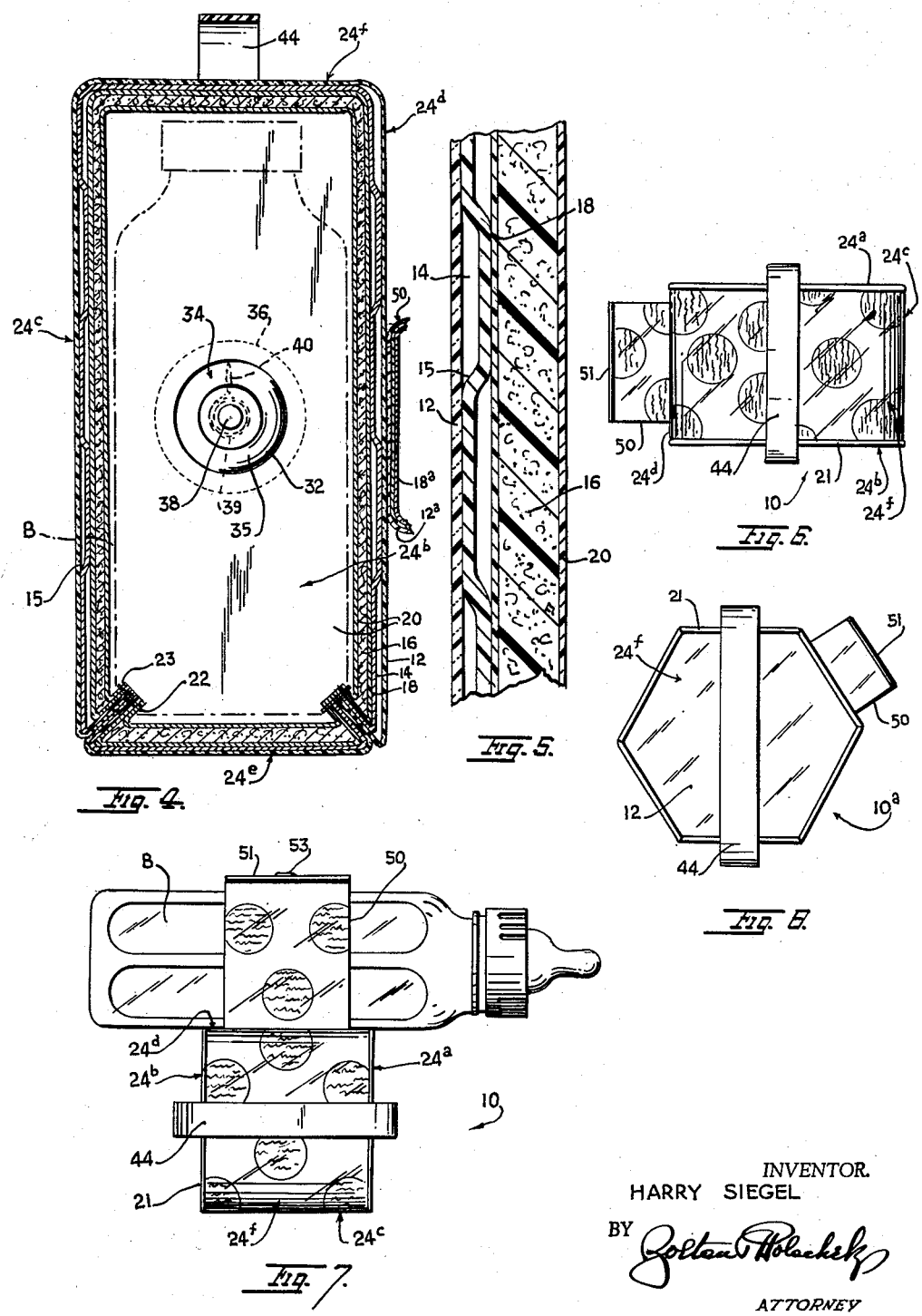

Nov. 17, 1964  H. SIEGEL  3,157,303
NURSING BOTTLE HOLDER
Filed April 15, 1963  3 Sheets-Sheet 3
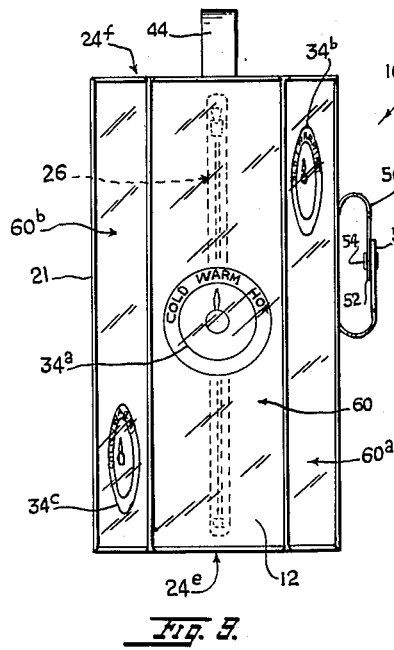
Fig. 9.
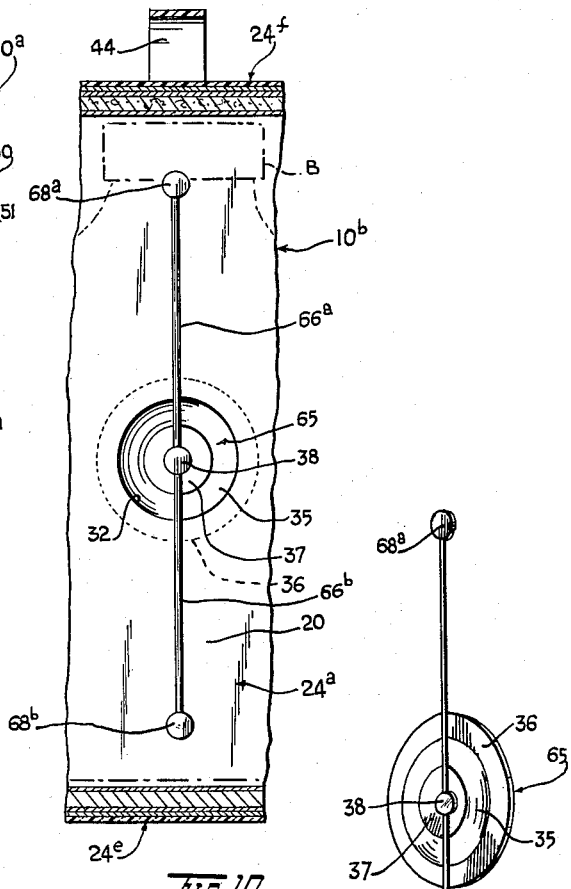
Fig. 10.
Fig. 11.
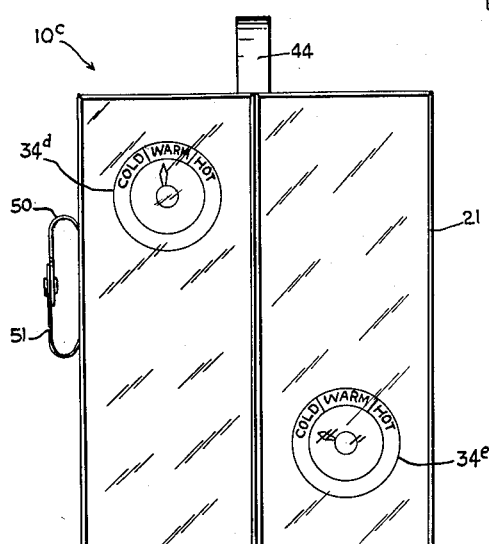
Fig. 12.
INVENTOR.
HARRY SIEGEL
BY
ATTORNEY United States Patent Office 3,157,303
Patented Nov. 17, 1964

3,157,303
NURSING BOTTLE HOLDER
Harry Siegel, 620 Fort Washington Ave., New York, N.Y.
Filed Apr. 15, 1963, Ser. No. 273,059
2 Claims. (Cl. 215—11)

This invention concerns an improved nursing bottle holder.

According to the invention there is provided a container made of waterproof, padded insulated material. The container is provided with a loop at its end for convenience in carrying the container. On a side of the container is a safety loop or strap which can be used to engage the bottle for holding it on the side of the container in a natural feeding position for an infant. The loops of the container permit attachment to a crib, or other support.

In one side of the container is a circular thermometer which indicates the temperature of the bottle inside the container. This thermometer is embedded in the side of the container and is protected by a sturdy, transparent, plastic face. The thermometer is thus easily read and is safely secured in the container side.

The container may have an attractively colored, padded inner layer with an internal liner insulated with plastic foam material. Thus the container is washable inside and out, attractive, safe, sanitary and practical. It will keep milk, juices, water or other liquids hot or cold. A slide fastener is provided in another side of the container to provide access to the interior thereof.

The container may be rectangular, hexagonal or have other suitable shape. The thermometer may be located in various positions and more than one thermometer may be provided.

It is therefore one object of the invention to provide an improved container for a nursing bottle, the container having laminated walls including an outer transparent plastic layer or face, an inner colored padded layer, and a thermally insulated plastic liner.

Another object is to provide a container as described, with a slide fastener in one side providing access to the interior thereof, a loop having ends engageable by snap fasteners on one side of the container, and a circular thermometer on another side of the container, the thermometer being located behind the transparent plastic layer.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIGURE 1 is a perspective view of a container embodying the invention.

FIG. 2 is another perspective view of the container shown rotated 180° from the position of FIG. 1.

FIG. 3 is a cross-sectional view on an enlarged scale, taken on line 3—3 of FIG. 1.

FIG. 4 is a longitudinal sectional view on a reduced scale taken on line 4—4 of FIG. 3.

FIG. 5 is a fragmentary sectional view on a greatly enlarged scale showing the laminated wall structure of the container.

FIG. 6 is a top plan view of the container of FIGS. 1-4.

FIG. 7 is an end view of the container with a nursing bottle shown mounted thereon.

FIG. 8 is a top plan view similar to FIG. 6 of another container.

FIG. 9 is a side elevational view of the container of FIG. 8.

FIG. 10 is a fragmentary sectional view similar to a part of FIG. 4 of another container.

FIG. 11 is a perspective view of the thermometer employed in the container of FIG. 10.

FIG. 12 is another side elevational view of the container of FIG. 8.

Referring first to FIGS. 1–7, there is shown a container 10 for a nursing bottle B indicated by dotted lines in FIGS. 3 and 4. The container is generally rectangular in both transverse cross section and longitudinal section. The container is formed of laminated material. Each side of the container has an outer transparent sheet plastic layer or face 12 formed of polyethylene, vinyl or the like. Juxtaposed to the outer layer 12 is an inner layer 14 also made of sheet plastic material. Layer 14 may be white or attractively colored in pink, blue or other pastel shades. The layer 14 may have various portions 15 formed with a wrinkled construction which define a soft, yielding padded structure. Juxtaposed to the layer 14 is an insulated liner including an inner thick plastic foam layer 16 covered on opposite sides with flexible sheet plastic layers 18, 20. Layer 18 is juxtaposed to layer 14 and layer 20 faces the interior of the container.

The container is formed of rectangular panels which are sewn together by stitching 22 and piping 21 at seams 23 located at internal corners of the container, joining sides $24^a$–$24^d$ and bottom $24^e$ together.

In one side wall $24^a$ is a longitudinal opening 25. A slide fastener 26 has its stringer tape 28 secured to opposite edges of the opening 25. The slide fastener has a slider 29 and mutually engageable teeth 30. The slide fastener is easly opened to permit the bottle B to be inserted in and removed from the container.

In side wall $24^b$ is an opening 32 in which is inserted a circular thermometer 34. This thermometer has an annular flange 36 which is engaged between layers 12 and 14 at the rim of opening 32. The outer side of flange 36 is marked with cold, warm and hot indicia 33. The thermometer has a frusto-conical body 35 extending rearwardly or inwardly into the interior of the container. At its flat inner wall 37 is a metal member 38 which conducts heat to a bimetallic coiled member 39 indicated in dotted lines in FIG. 4. This coiled member is located in body 35 of the thermometer. A pointer 40 is carried at the outer end of coiled member 39 and rotates around the inside of body 35 to indicate changing temperatures of the interior of the container. When bottle B is adjacent to or contacts metal member 38 inside the container, the thermometer indicates the temperature of the bottle, on the face of the thermometer exposed outside at the exterior of the container. As a further protection to the thermometer which is covered by transparent layer 12, may be provided at inner transparent plastic face 42 indicated by dotted lines in FIG. 3. This face may be set into the body 35 at its inner open end flush with flange 36.

On the top end $24^f$ of the container is affixed a plastic band 44 defining a loop by means of which the container can be conveniently carried, secured to a support in a crib or the like, or held in the hand by a person feeding the infant.

The nursing bottle can be engaged by a loop 50 formed from a piece of material having multiple layers. Layer $12^a$ is a transparent plastic one. Layer $14^a$ is a colored, padded one. Layer $18^a$ is an inner smooth plastic one. The loop 50 has free ends 51, 52 mutually engageable by snap fastener elements 53, 54 on the two ends. The loop 50 is secured to layer 12 of side wall $24^d$ by lines of heat sealing or welding 55, shown in FIG. 2. FIG. 7 shows nursing bottle B supported on side $24^d$ of the container in feeding position for an infant. The loop 44 can be held by a person feeding the baby or this loop can be pinned or otherwise attached to a crib blanket or sheet to hold the bottle and container assembly stationary.

FIGS. 8 and 9 show container 10ᵃ which is hexagonal in cross section. One circular thermometer 34ᵃ is located near the center of container wall 60. A second circular thermometer 34ᵇ can be located near the top of container wall 60ᵃ. A third circular thermometer 34ᶜ can be located near the bottom of container wall 60ᵇ. These differently located thermometers will indicate temperatures in the container at different points therein. Other parts corresponding to those of container 10 are identically numbered.

In FIGS. 10 and 11 is shown a thermometer 65 having two metal arms 66ᵃ, 66ᵇ extending in alignment above and below contact member 38. At the outer ends of the arms 66ᵃ, 66ᵇ are metal contact members 68ᵃ, 68ᵇ which quickly assume the temperature of the interior of the container 10ᵇ at the top and bottom zones respectively. Contact member 38 initially assumes the temperature at the center range or zone of the container interior, but this is modified by the heat conducted toward or away from the member 38 by arms 66ᵃ, 66ᵇ. The member 38 finally assumes a temperature which is an average of temperatures in different zones or locations of the container interior. Thus the thermometer 65 will indicate an average temperature reading for bottle B'.

The containers in the various forms described, provide a parent or caretaker with reliable and convenient indications of the temperature inside the container. This is quite important, since liquids to be fed to infants must be held at certain temperatures at all times. The container construction and assembly assures that nursing bottles and other liquid containing bottles are held at desired hot, cold or warm temperatures for long periods. The containers are attractive in appearance, soft to touch, flexible, sanitary, and very durable. They are readily washable inside and out. They are easily carried about by hand or in a carriage, car, etc. They are sturdy, attractive and practical.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A container or holder for a nursing bottle, comprising a closed casing having walls joined together at edges thereof by seams, each of said walls having a laminated structure; said structure including a transparent plastic outermost layer, an intermediate colored layer juxtaposed to the outermost layer, and an inner liner; said liner including a pair of thin, smooth plastic sheets with a cellular, plastic foam pad disposed between the sheets, one of said sheets being juxtaposed to the intermediate layer, the other one of said sheets being exposed to the interior of the casing, a circular thermometer in one of said walls, said thermometer having a readable face exposed at the exterior of the casing, a slide fastener in another of said walls providing access to the interior of the casing, said thermometer having a metal member exposed inside the casing at the center of said one wall for sensing the temperature in a center zone inside the casing, and a pair of metal arms extending radially outward of said member in axial alignment with each other for conducting heat between said metal member at said center zone and other zones inside the casing, so that the thermometer indicates a temperature which is the average of the temperatures in said zones.

2. A container or holder for a nursing bottle, comprising a closed casing having walls joined together at edges thereof by seams, each of said walls having a laminated structure; said structure including a transparent plastic outermost layer, an intermediate colored layer juxtaposed to the outermost layer, and an inner liner; said liner including a pair of thin, smooth plastic sheets with a cellular, plastic foam pad disposed between the sheets, one of said sheets being juxtaposed to the intermediate layer, the other one of said sheets being exposed to the interior of the casing, a circular thermometer in one of said walls, said thermometer having a readable face exposed at the exterior of the casing, a slide fastener in another of said walls providing access to the interior of the casing, said thermometer having a metal member exposed inside the casing at the center of said one wall for sensing the temperature in a center zone inside the casing, a pair of metal arms extending radially outward of said member in axial alignment with each other for conducting heat between said metal member at said center zone and other zones inside the casing, so that the thermometer indicates a temperature which is the average of the temperatures in said zones, and a band secured to a third one of said walls at the exterior thereof, said band having free opposite ends with fastener members thereon for forming a loop to hold the bottle on said third wall.

References Cited in the file of this patent

UNITED STATES PATENTS

| | | |
|---|---|---|
| 1,196,320 | Weber | Aug. 29, 1916 |
| 2,357,692 | Saffady | Sept. 5, 1944 |
| 2,725,324 | Holes | Nov. 29, 1955 |
| 3,081,895 | Siegel | Mar. 19, 1963 |
| 3,095,743 | Teasel | July 2, 1963 |
| 3,125,984 | Okuyama | Mar. 24, 1964 |